Nov. 8, 1938.  G. A. SCHMITT  2,136,319

SLICING MACHINE

Filed Jan. 7, 1936  7 Sheets-Sheet 1

Fig. 1.

Inventor
GEORGE A. SCHMITT.
By Milans & Milans
Attorneys

Nov. 8, 1938.  G. A. SCHMITT  2,136,319
SLICING MACHINE
Filed Jan. 7, 1936  7 Sheets-Sheet 4

Inventor
GEORGE A. SCHMITT
By Milam + Milam
Attorneys

Nov. 8, 1938.   G. A. SCHMITT   2,136,319
SLICING MACHINE
Filed Jan. 7, 1936   7 Sheets-Sheet 5

Inventor
GEORGE A. SCHMITT
Milans + Milans
Attorneys

Nov. 8, 1938.      G. A. SCHMITT      2,136,319
SLICING MACHINE
Filed Jan. 7, 1936      7 Sheets-Sheet 6

Inventor
GEORGE A. SCHMITT
By Milam & Milam
Attorneys

Nov. 8, 1938.　　　　G. A. SCHMITT　　　　2,136,319
SLICING MACHINE
Filed Jan. 7, 1936　　　　7 Sheets-Sheet 7

Inventor
GEORGE A. SCHMITT
By Milans + Milans
Attorneys

Patented Nov. 8, 1938

2,136,319

UNITED STATES PATENT OFFICE 2,136,319

SLICING MACHINE

George A. Schmitt, Boise, Idaho

Application January 7, 1936, Serial No. 57,971

15 Claims. (Cl. 146—78)

This invention relates to certain new and useful improvements in a slicing machine, and more particularly to that type of mechanism known as a potato slicer, wherein it is desirable to produce a uniform wafer-like slice which is subsequently treated, as by being cooked, and produced on the market as the well-known "potato chips".

Manufacturers in this particular line have found it extremely difficulty to produce a sliced product which will retain its freshness and crispness for any extended period of time and, therefore, their sales have been confined more or less to local territory. In the heretofore known potato-slicing machines the wafer-like slices are produced by a reciprocatory knife which severs the product in straight cuts; and when such slices are cooked they bend and curl into various shapes and forms, are extremely brittle and, therefore, hard to handle in the disposal of the same in their desired condition to the public. It also has been found that the curls and twists of such produced wafers tend to form pockets for the reception of portions of other wafers which through their extended surface contact start the action of fermentation between said contacting parts and thus deteriorate the value of the product.

It is the main object of the present invention to overcome the above-mentioned objections by producing a slice which is cross-scored on its opposed faces and in different planes. This grooving or scoring tends to more or less stiffen the body of the cooked slice so that less breakage takes place during the handling of the product, and the cooked slices, furthermore, will not assume the curled and twisted forms, so characteristic of the now produced potato chips.

Another object of the present invention is the provision of a machine employing a single reciprocatory knife which is alternately shifted into different angular positions, relative to the stock to be sliced, whereby the opposite faces of the slice will be cut in different planes.

A still further object resides in the novel manner of actuating the single knife from a pair of operative mechanisms with which the knife is alternately associated.

Another object of the invention is the provision of a slice gauge by which the thickness of the slice produced may be governed.

A further object resides in the novel manner of positively releasing the sliced product from the machine, thereby preventing the adherence of the slice to the face-plate of the gauging element.

A still further aim of the invention resides in the provision of an intermittently operated feed by which the articles are properly directed to the action of the slicing machine.

A still further object of the invention is to provide a feed-releasing mechanism which comes into play at the instant of the engagement of the stock with the gauge-plate of the machine.

Another object of the invention is the novel manner of directing the articles from the hopper to the feed trough so that said articles will be longitudinally disposed therein.

These and other objects will readily present themselves to those skilled in this particular art when the following specification is read in connection with the attached drawings, wherein I have illustrated the preferred form of my invention; but it is to be understood that certain changes and modifications may be resorted to without departing from the spirit of the invention. The scope of protection contemplated will appear from the appended claims.

In order to more fully understand the present invention, reference will now be made to the detail parts which enter into the combination to form the complete machine.

Figure 11:
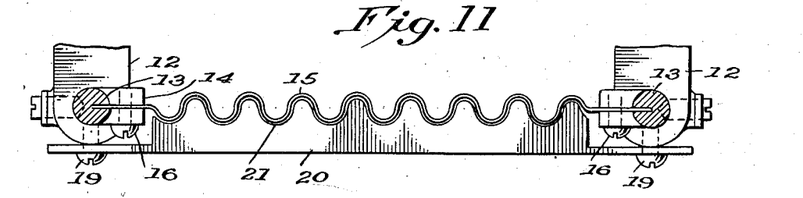
Figure 11 is an enlarged detail view of a guard element which is associated with the slicing knife to prevent retraction of the slices as the knife is moved in an upward direction.
Figure 12:
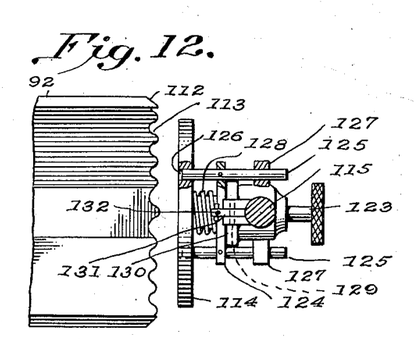
Figure 12 is a detail view, partly in section, of the slice-gauging plate used in connection with the machine.
Figure 13:
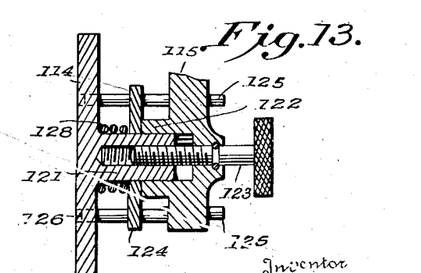
Figure 13 is a cross-sectional view of the gauge-plate and its associated parts as shown in Figure 12.

The base-plate 1 may be so formed as to be clamped, as at 2, to a table top as indicated at 3 or, if desired, the table top may constitute the base-plate of the machine. Secured at the forward end of the base-plate 1 is an upstanding plate 4 which forms the support for the slicing mechanism. The plate 4 is provided with a forwardly-extending circular flange 5 to the forward face of which is secured by screws 6 the arcuate plate-member 7. This member 7 is grooved as indicated at 8 and forms, with a companion groove 9 within the shiftable segmental frame 10, a race-way for the reception of bearings 11 which facilitate the shifting movements of the frame 10. Extending forwardly from the frame 10 are a plurality of bars 12 which are apertured to form slide bearings for the side arms 13 of a reciprocatory knife frame 14. Secured in any desired manner within this frame and extending from side arm to side arm thereof is a slicing knife 15. This knife, as shown in the present invention, is of wave-like or corrugated form and is held in place within the frame 14 by pressure screws 16. The knife frame is furthermore provided at its upper portion with a rearwardly-extending pin 17 and a roller 18 for a purpose that will hereinafter appear. Secured to the forward ends of the upper bars 12 by attaching screws 19 is a guard element 20 which, as shown in Figure 11, is provided with a corrugated inner face 21 to closely align with the surface of the slicing knife 15. The purpose of this guard will be hereinafter described.

Figure 3:
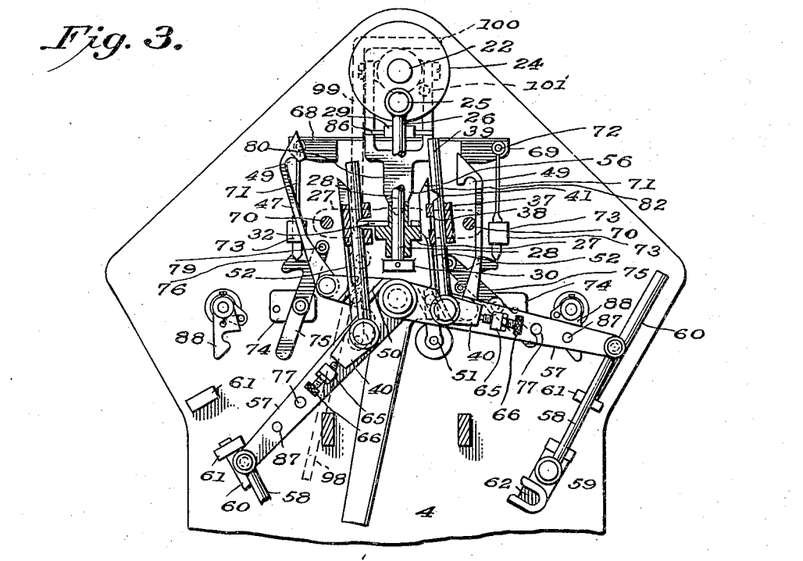
Figure 3 is an enlarged detail view, partly in section, illustrating the operation of the actuating arms with which the knife is alternately coupled.
Figure 4:
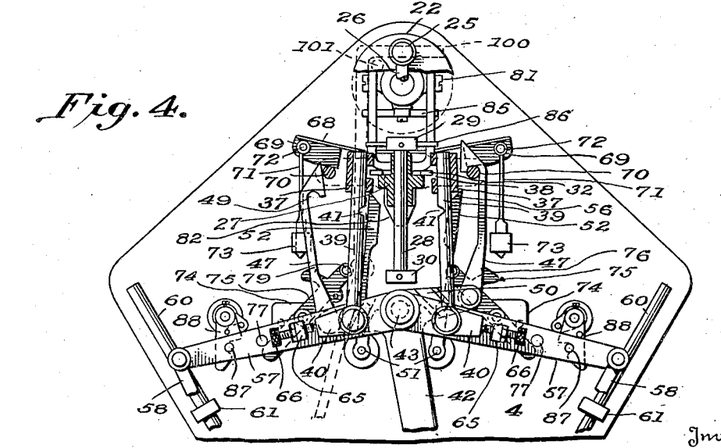
Figure 4 is a similar view, but showing the parts in their fully elevated or retracted position, in which position the knife shifting lever has been swung on its pivot and the knife thereby moved into active association with the opposed arm.
Figure 5:
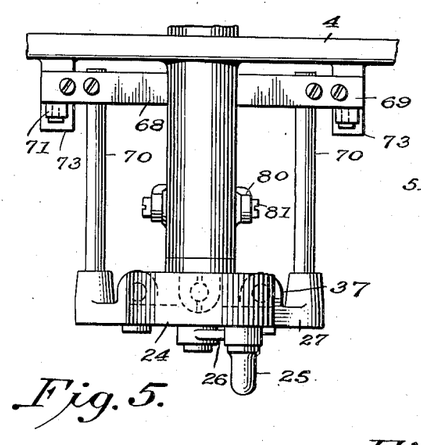
Figure 5 is a top plan view of the fore-portion of the machine, showing the drive-shaft and the underlying slidable head with the rearwardly-extending rods.
Figure 6:
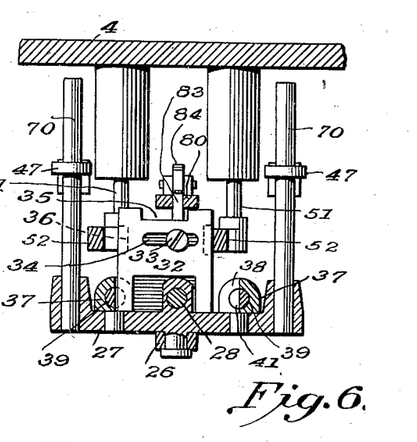
Figure 6 is a sectional view showing the slidable head in section and the lock-plate shifted to engage the operating rod at the left of said view.

Extending longitudinally of the machine and at the top portion thereof is a drive shaft 22 provided with any conventional take-off from the motive power of the machine; and for the purpose of illustration there is shown a belt pulley 23 keyed to the shaft 22. Keyed to the forward end of the shaft 22 is a rotatable disc 24 having a pin 25 secured thereto. One end of a drive pitman 26 is connected to the pin 25 and the opposite end of the pitman is pivotally connected to a vertically movable slide block 27. This block 27 is slidably mounted on the vertically-extending rod 28 which is attached at its upper end to a forwardly-extending arm 29 and at its lower end to the arm 30. The slide block 27 has a rearwardly-extending portion or shelf 31 upon which is slidably mounted a lock plate 32. A screw 33 extending through the elongated slot 34 in the lock plate 32 prevents the removal of the plate but permits reciprocation thereof. This slide block has a notched portion 35 within its rear edge and furthermore has beveled areas 36 within its side walls, all of which will be further described hereinafter. Pivotally secured and arranged against the rear face of the slide block 27 are sleeves 37 which, as shown in Figures 3 and 4, are slotted as at 38.

Slidably mounted within the sleeves 37 are rods 39 each of which at its lower end is connected to a pivoted arm 40. The rods 39 are provided with notches 41 adapted to alternately receive the lock plate 32 and thereby form a mechanical coupling between either one of the rods 39 and the slide block 27.

The knife shifting lever 42 is pivotally mounted at its upper end on a support 43 and its lower end is slotted as at 44 to receive the pin 45 which extends forwardly from the shiftable segmental frame 10. The upper end of the lever 42 has outwardly-directed arm portions 46 to the terminal ends of which are pivotally secured upwardly-extending rods 47. These rods are suitably maintained in their inward positions by means of springs 48, as suggested in Figure 9, unless moved or retained by other mechanical parts during the operation of the machine. The upper ends of the rods 47 are provided with hooked portions 49. The arm portions 46 of the lever 42 are also provided with upwardly and inwardly directed slots or groove-ways 50.

Pivotally mounted upon pins 51 extending forwardly from the upstanding plate 4 are slide-actuating members 52. These members 52 are spring-tensioned, as at 53 in Figure 10. The movement of each of these slide-actuating members 52 is accomplished by providing the member with an outstanding pin 54 having thereon a roller 55 which is received within the adjacent groove-way in the arm portions. The upper ends of the slide-actuating members are inwardly beveled, as at 56, and are adapted to cooperate with the beveled areas 36 of the slide block 27.

Pivotally mounted on the support 43 extending from the upstanding plate 4 is a pair of oppositely-extending arms 57. Pivotally attached to the outer end of each arm 57 is a link 58 which is pivotally attached at its opposite end to a coupling head 59 secured to the lower end of a reciprocatory rod 60, which latter is properly guided in its movements by bearings 61 extending forward from the upstanding plate 4. Furthermore, each coupling head 59 has an inwardly open-ended socket 62 formed therein, which is adapted to receive the rearwardly-extending pin formation arranged on the knife frame.

Figure 7:
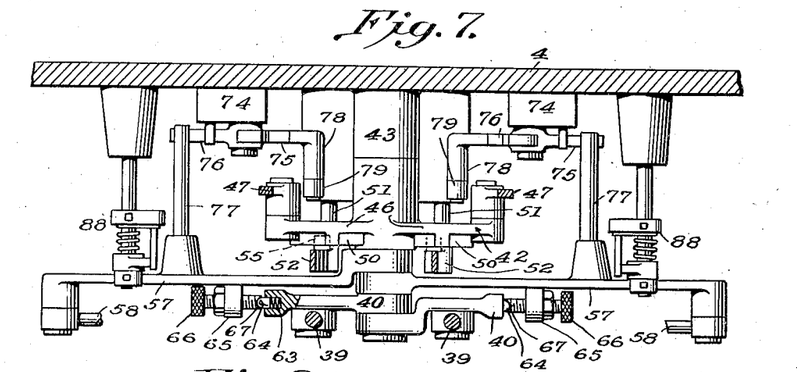
Figure 7 is a sectional view taken on line 7—7 of Figure 2, looking in the direction indicated by the arrows.

In order to provide a releasable connection between the drive-shaft and the knife in the event the latter should meet with some objectionable obstructions, the ends of the arms 40 are recessed, as in Figures 3, 4, and 7, to receive a spring 63 which outwardly urges a ball 64. Threadedly engaged within lugs 65 extending forwardly from the arms 57 are adjustable screw-rods 66 the inner ends of which are socketed, as at 67, to receive the spring-pressed balls 64 carried by the arms 40.

Secured to the under surface of the forwardly-extending arm 29 and projecting to either side thereof is a spring plate 68 provided with terminal enlarged portions 69 with which the rearwardly-extending rods 70 carried by the slide block 27 are adapted to cooperate during the upward stroke of the slide block, as shown in Figure 4. Depending latch rods 71 are pivotally secured at 72 to the ends of the spring plate 68, and in order that the latch rods may move only in a vertical plane they are guided within apertured lugs 73 projecting from the face of plate 4.

Pivotally mounted on supports 74 directly beneath the latch rods 71 are levers 75 each of which is provided with an off-set kerfed portion 76 adapted to receive the lower end of the superposed latch rod 71 when the levers are swung on their pivots. The outer ends of the levers 75 are arranged within the path of movement of pins 77 extending rearwardly from the arms 57. The inner ends of the levers 75 are offset, as suggested at 78 and are provided with rollers 79 to constitute retaining means for holding one or the other of the upstanding hooked rods 47 away from the zone of movement of the rearwardly-extending rods 70 carried by the slide block 27. The release of the latch is accomplished when the rods 70 are elevated to their highest point, as shown in Figure 4, wherein it will be noted that the rods 70 have engaged the heads 69 of the spring plate and that the latch rods 70 have been retracted.

In order to retain the lock plate 32 in its central or neutral position during certain movements of the machine there is provided a yoke member 80 pivoted at 81 and adapted to coact at its lower end with the notched portion 35 of the lock plate. The lower end of the yoke is pointed, as suggested at 82, to assist in the centralization of the lock plate during the latter portion of the upward movement of the slide block. The yoke is also provided with a spring-pressed pawl 83 which is adapted to coact with the rear surface of the shelf 31 on the slide block 27 when the latter is moved in a downward direction (see Figure 8), thereby swinging the yoke on its pivot and removing the lower portion of the yoke from locking engagement with the lock plate.

Figure 8:
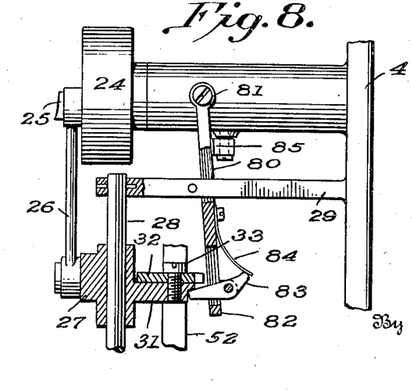
Figure 8 is a side view of the construction shown in Figure 5, the rearwardly-extending arms being omitted and the slidable head in section, for the purpose of clarity.
Figures 9, 10:
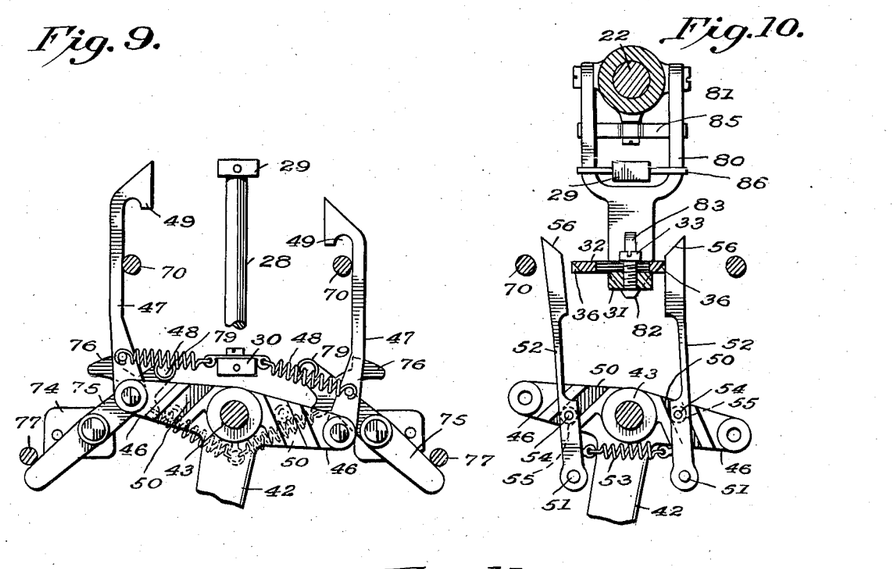
Figure 9 is an enlarged detail view illustrating the mechanism by which the knife-shifting lever is alternately moved from right to left on successive strokes of the apparatus.
Figure 10 is a view partly in section showing the mechanism for alternately shifting the lockplate through the movements of the cross-arm of the knife-shift lever.

The continued downward movement of the slide block 27 causes it to slip past the pawl and permit the spring 84 to return said pawl to its normal upright position and set for the next downward stroke of the slide block. A transversely extending spring blade 85, as shown in Figures 8 and 10, urges the pivoted yoke 80 to its forward position, and a pin 86 extending outwardly from the bar member 29 limits the forward swing of the yoke 80. The arms 57 are provided with rearwardly-extending pins 87 which are adapted to coact with retaining pawls 88 so as to temporarily hold the arms in their elevated positions. The arms 57 are furthermore provided with extending pins 77 which are adapted to wipe against the ends of the latch levers 75 during the forepart of the swinging movements of said arms.

The description of the operation of the parts so far described will now be given. Assuming that the slide block 27 is in its fully elevated position, as shown in Figure 4, the lock plate 32 is centrally disposed and is retained in this position by the engagement of the lower end of the yoke 80 within the recess portion of the lock plate 32. The hooked rod 47 on the right side of the machine will be engaged by the rearwardly-extending rod 70, resulting in the pivoting of the knife shift-lever to the right. Such action will cause the swinging of the knife-carrying frame 14 from the left to the right and couple the frame with the actuating member located on the right side of the machine. The slide-actuating members are set so as to position the member on the left side of the machine for engagement with the lock plate 32 when the slide block 27 is lowered. As the slide block descends, the yoke 80 is removed from locking engagement with the lock plate and immediately thereafter the lock plate comes into engagement with the beveled surface of the slide-actuating member on the left-hand side of the machine. This results in a shift of the lock plate to the right and its engagement within the notch 41 in the rod 39. The rod being mechanically connected to the arm 57 will thereby cause a cutting stroke to be given to the knife on the right side of the machine. When the arm 57 is moved, the pin 87 slips from engagement with the retaining pawl 88 and the pin 77 wipes against the end of the latch lever 75, thereby swinging said lever on its pivot and causing the offset portion 78 at the opposite end of the lever to come into engagement with the inner surface of the hooked rod 47. This will remove the rod, against its spring tension, to a position where it will not be engaged on the next upward stroke by the rearwardly-extending rod 70. The latch lever will be retained in this position through the engagement of the latch rod 71 within the kerfed portion 76 of the lever 75. On the up-stroke of the machine, the knife will be retracted to its uppermost position, at which instant the lower end of the yoke centralizes the lock plate, and also the rearwardly-extending rod 70 will engage in the hooked rod 47 and shift the knife lever to perform the slicing action from the left side of the machine. The continued upward movement of the slide block 27 will cause the rearwardly-extending rods 70 to engage the overlying spring plate and withdraw the latches 71, thereby releasing the hooked rod 47 on the right side of the machine so that it will be in position for the next upward stroke.

The illustration in Figure 3 shows clearly the full down-stroke of the parts for a slicing action from the left side of the machine, in which it will be noted that the lock plate is in engagement with the rod 39 on the left and the hooked rod 47 on the right is in position to be engaged by the rod 70 on the up-stroke, while the hooked rod 47 on the left is retained in its outward position by the latch lever.

Figure 14:
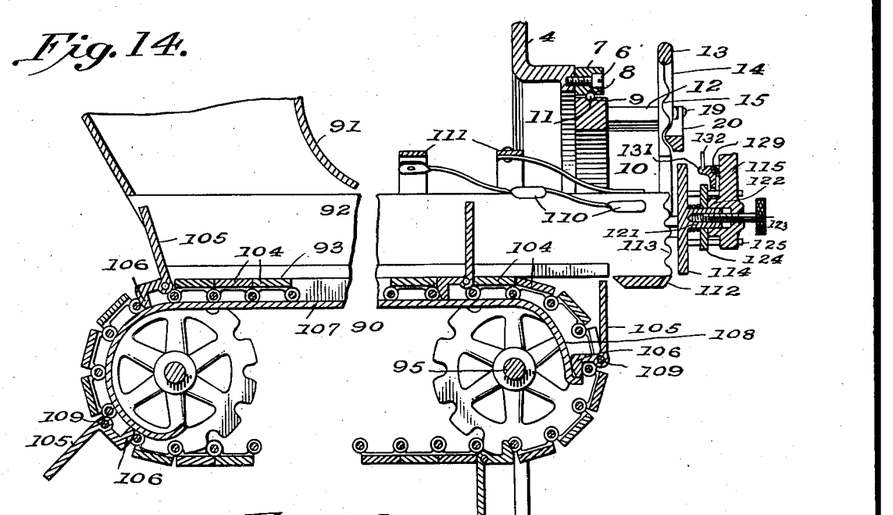
Figure 14 is a longitudinal sectional view of the lower portion of the machine illustrating the feed trough and the conveyor by which the articles are fed to the action of the slicing knife.
Figure 15:
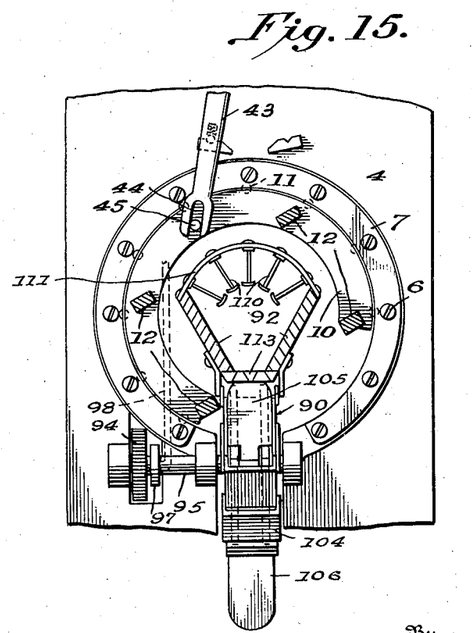
Figure 15 is an enlarged detail view of the shiftable knife-supporting frame.
Figure 16:
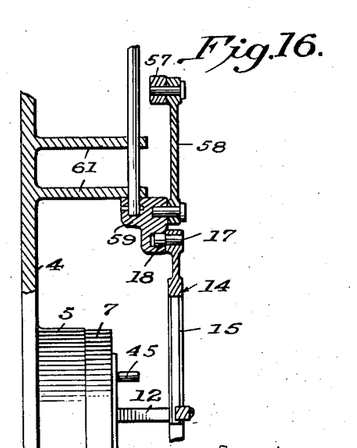
Figure 16 is a further detail view, partly in section, showing the knife frame coupled to one of the reciprocatorily-actuated members.
Figure 17:
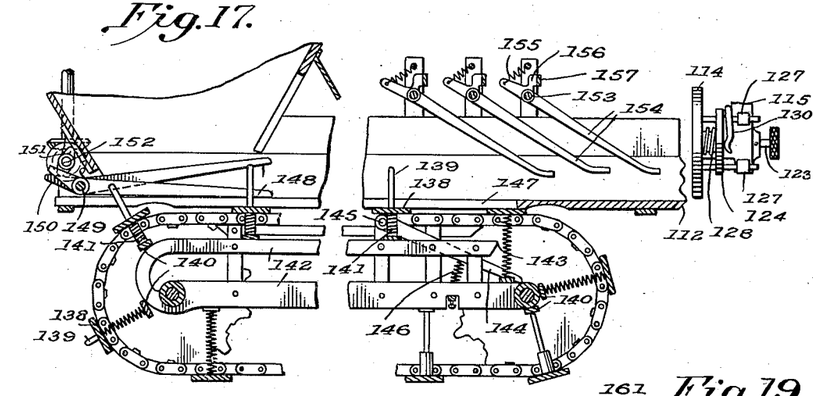
Figures 17 is a view in side elevation of a modified form of feed mechanism.

In the present case there is also suggested a feed mechanism 90 whereby the articles, such as potatoes, are properly fed to the action of the slicing knife 15. In this construction there is shown a hopper 91 into which the articles in bulk may be placed and a trough 92 for directing the articles from the hopper to the slicing knife. The lower wall of this trough is in the form of an endless conveyor 93 which is given suitable intermittent forward impulses in any desired manner, and as an illustration of this movement there is suggested a ratchet member 94 keyed for rotation with one of the conveyor shafts 95, and coacting with this ratchet member is a pawl 96 carried by a pivoted lever 97. This lever 97 is actuated by a link-98-and-a-bar-99 construction, the bar being provided with an angularly-extending head 100 which is actuated by the pin 101 mounted on the driven disc 89. In order to prevent the rearward movement of the ratchet, a retaining pawl 102 is provided. This pawl is mounted on a stationary support 103. As shown in Figure 14, the endless conveyor 93 is composed of a series of hingedly-connected plates 104.

Pivoted blade members 105 are associated with some of the plates 104 to constitute pushing elements to propel the potatoes through the trough. The blade members 105 have depending foot portions 106 which are adapted to have sliding contact with an underlying surface 107 cammed at its forward end, as at 108, to permit the blade members to swing on their respective pivots 109.

Located above the trough 92 and adjacent its outlet end is a series of forwardly-extending spring-fingers 110 adapted to slightly press on the potatoes to retain them in their proper position within the trough. These spring-fingers are suitably supported in position through their connection with the straps or bars 111 which extend transversely across the trough and are secured to the side walls thereof. The forward end of the trough, including the base and side walls, is beveled, as at 112, and transversely grooved or corrugated, as at 113, the corrugations being formed in keeping with the surface formation of the slicing knife.

Adjacent the outlet end of the trough 92 is a gauge-plate 114 associated with the lower end of a vertically-extending lever 115 pivoted at 116 to a bracket 117 extending forwardly from the plate 4. The upper end of the lever 115 is provided with a head portion 118 with the inner and upper half portion removed, as at 119, to constitute a high and a low acting camming surface which is adapted to be acted upon by the pin 25 carried by the rotatable disc 24. The lever is constantly held in engagement with the drive-pin 25 by a spring 120 coiled about the pivotal point of said lever. The gauge-plate 114 has an internally-threaded sleeve 121 which is slidably received within a socket 122 formed in the lower end of the lever 115. Rotatably retained in the lower part of the lever 115 and in alignment with the socket 122 there is an externally-threaded rod 123 adapted to threadedly fit the sleeve 121 and by its movements control the desired adjustment of the gauge-plate. Slidably arranged on the sleeve 121 of the gauge-plate 114 is a disc 124 to which is rigidly connected a series of oppositely-extending rods 125. The forward ends of the rods are received within openings 126 formed in the gauge-plate, while the opposite ends of said rods are positioned within and guided by the apertured lugs 127 carried by the lever 115. The disc 124 is tensioned toward its retracted position by the spring 128.

The disc 124 and the associated rods 125 constitute a means for preventing the slices from adhering to the face of the gauge-plate 114. A member pivoted at 129 to the lever 115 has a depending arm 130 which at its lower end bears against the outer face of the disc 124 and an angular-extending arm 131 to which the lower end of a rod 132 is attached. The upper end of the rod 132 is rigidly affixed to the stationary bracket 133. During the operation of the machine the lever 115 will be positively actuated by the pressure of the pin 25 against the high cammed surface of the head 118, so as to cause the gauge-plate to be in proper gauging position during the slicing operation, after which the spring will cause the lower end of the lever to assume its outward position as the drive-pin moves to the reduced surface of the head 118. This outward movement of the lower portion of the lever 115 is accompanied by a pivotal movement of the depending arm 130, thereby causing a push on the disc 124 and its associated parts, so that any slice that may adhere to the face of the gauge-plate 114 will be forced therefrom by the rods 125. It will also be noted that the close association of the guard element 20 with the slicing knife 15 will prevent the slice from following the upward movement of the knife.

Figure 1:
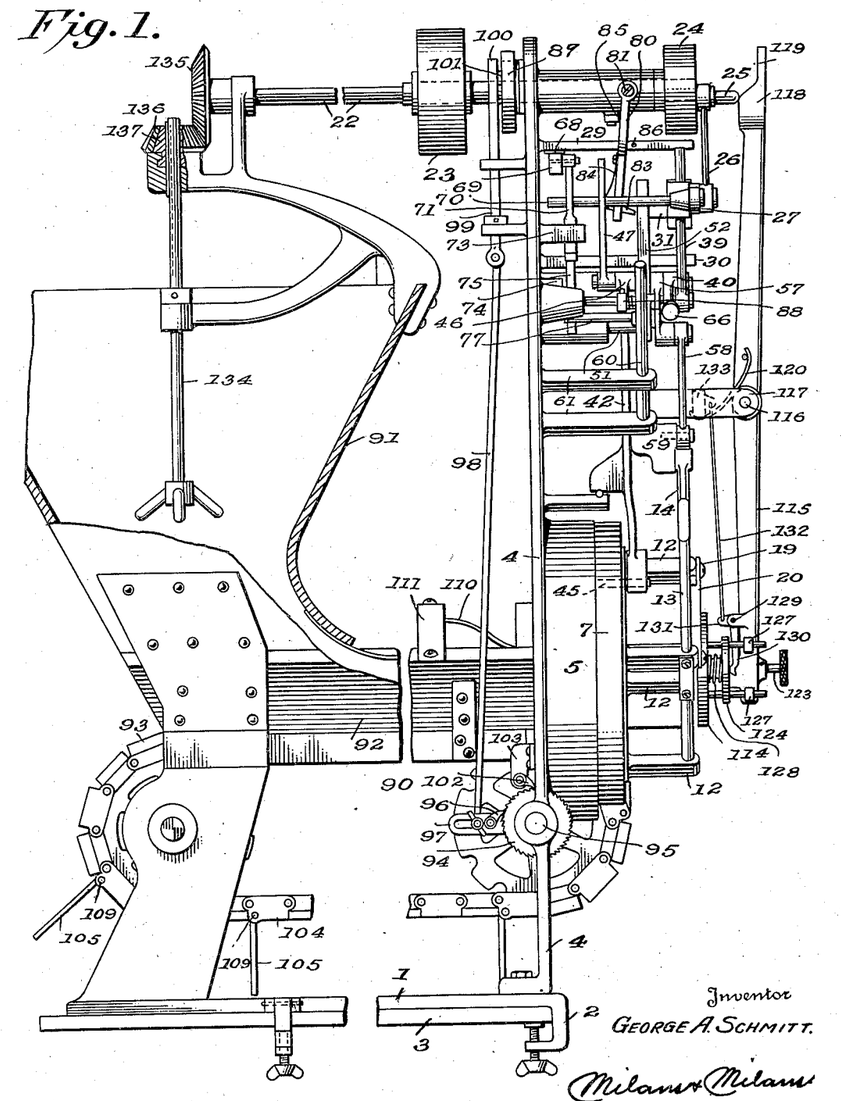
Figure 1 is a side elevation of the machine partly in section.
Figure 2:
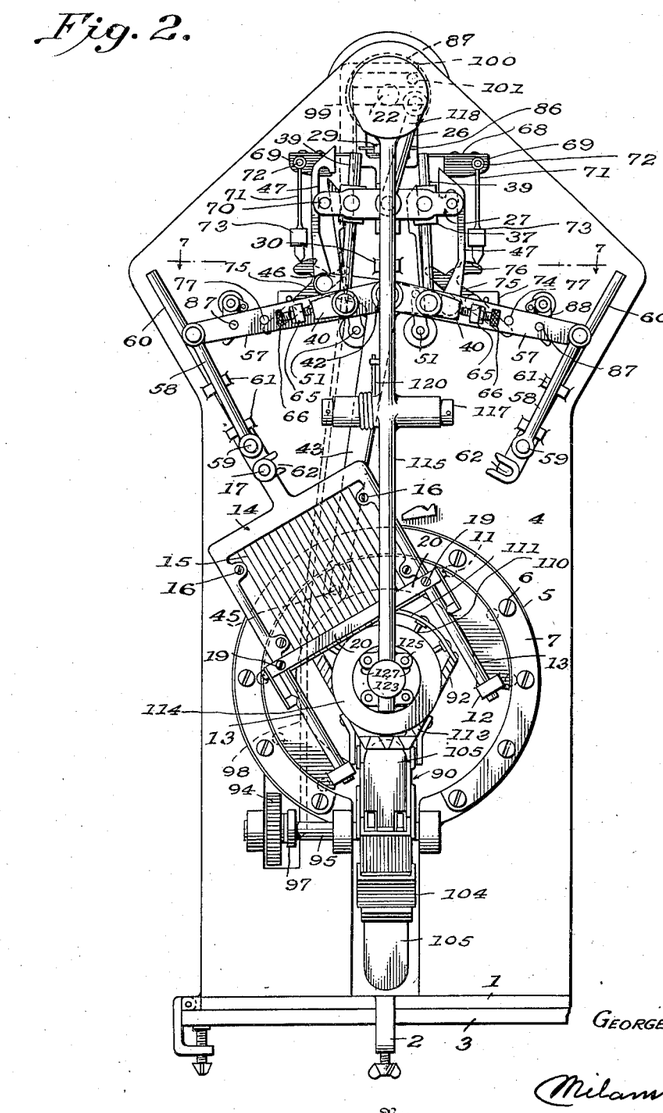
Figure 2 is a front view of the machine showing the knife associated with one of the operating arms and in position for its cutting stroke.

The hopper 91 may be provided with an agitator 134, as suggested in Figure 1, for the purpose of facilitating the feed of the potatoes from the hopper to the trough. This agitator may be actuated as, for instance, from the power shaft of the machine by intermeshing gears 135—136. There is also suggested a slip connection in this agitator drive, which merely consists of a frictional engagement between a tapered cone 137, which is keyed to the agitator shaft, and the internally-beveled surface of the gear element 136. This connection is provided for the purpose of permitting slippage in train of drive in the event the agitator should meet with any serious obstruction.

A modified form of conveyor mechanism is illustrated in Figures 17, 18, 19, and 20, wherein the transversely-extending bars 138 are each provided with a series of fingers 139 slidably projecting therethrough. Each series of fingers 139 is interconnected at the inner ends of the fingers to a transversely-extending plate 140, and between the said plate and the lower face of bars 138 the fingers are surrounded by an expansion spring 141. The fingers are maintained in their projected positions by the sliding action of the plate 140 on the surface of the cam track 142 which terminates at 143 at the forward end of the conveyor. When the plates 140 slip off the cam track at 143 the springs 141 will immediately cause a retraction of the fingers below the bottom wall at the forward end of the trough. To assist in this retracting movement, there is shown a pair of levers 144 pivoted at 145 slightly above the upper surface of the cam track 142 and extending in a diverging direction, resting at their forward ends against the hub of the forward sheave of the conveyor 93. Springs 146 are used to tensionally hold the levers in this position. When the plates 140 approach the forward end of the cam track 142 their outer ends will engage the under surface of the levers 144 causing the levers to lift against the tension of the springs 141. When the plates 140 leave the cam track at 143, these spring-tensioned levers will assist in the retraction of the fingers 139. This allows the fingers to swing about the forward sheave of the conveyor without having an increased propelling force on the potatoes in the forward end of the trough. The bottom of the trough in this modified form is of slotted formation, as shown at 147, to permit the longitudinal movement of the projecting fingers. Adjacent the rear end of the trough and below the hopper is a modified form of an agitating element which assists in the longitudinal disposition of the potatoes in the trough. This construction embodies a pair of longitudinally-extending fingers 148 pivoted at 149 and having at their rear ends cam-engaging surfaces 150. These surfaces 150 are adapted to be alternately engaged by the cams 151 arranged on a driven shaft 152 in the machine. The alternate actuation of these fingers will raise one of the ends of any potato that happens to be transversely disposed and permit the fingers 139 to pull the opposite end of the potato in a forward direction, thereby longitudinally positioning said potato, which will be in proper feeding position for the next series of fingers.

There is also suggested a modified form of the spring-actuated pressure fingers located at the outlet end of the trough. Pivotally mounted on transversely-extending rods 153 are the fingers 154 which at their forward end are adapted to contact with the passing potato. The rear ends of the fingers are spring-tensioned as at 155. The fingers 154 are also provided with lugged extensions 156 for coacting with transversely-extending bar members 157 to thereby limit the pivotal movements of the fingers under the tension of the spring 155.

Figures 18, 19, 20:
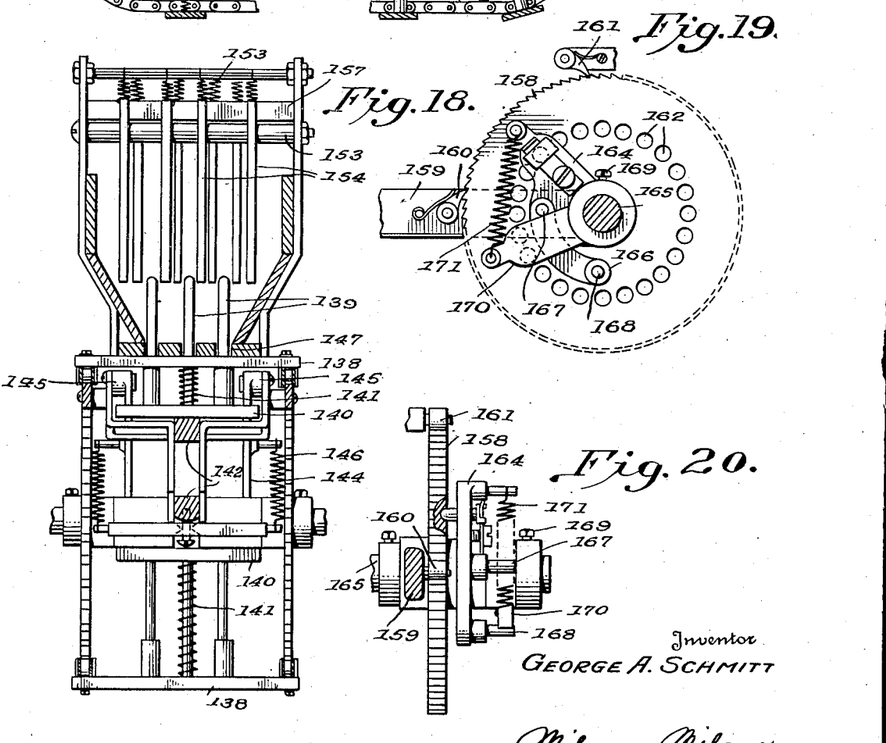
Figure 18 is a transverse sectional view of the construction shown in Figure 17.
Figure 19 is a detail view of the feed-releasing mechanism by which the progressive feed of the conveyor may be terminated at the instant of contact of the article with the gauging element located at the exit end of the feed trough, thereby relieving the feed mechanism from excessive strain.
Figure 20 is an end view of the feed-releasing mechanism shown in Figure 19.
Figure 21:
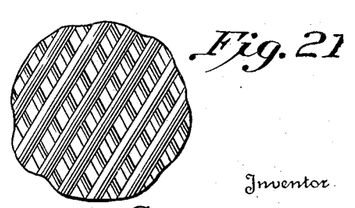
Figure 21 illustrates the product that will be produced in this machine, showing the cross-scoring or grooving on the opposite faces of the slice.

In Figures 19 and 20, a modified form of the ratchet feed is suggested, and in this construction the necessary relief of the forward impulses is afforded in keeping with the adjustment of the gauge-plate at the outlet end of the trough. In this showing, the ratchet 158 is operated by the pivoted arm 159 through the spring-pressed pawl 160. The pawl 161 prevents retrograde movement of the ratchet. The ratchet 158 is provided with a circular series of indentations 162 to receive the rounded end of a spring-pressed finger 163 carried by an arm 164 pivotally mounted on the conveyor shaft 165. The arm 164 has an arcuated extension 166 to which is secured outstanding pins 167—168. Rigidly attached to the shaft 165, as by screw 169, is an outwardly-extending arm 170 which is positioned between the pins 167—168. The terminal end of the arm 164 is connected to the outermost end of the arm 170 by a contractible spring 171. The movement of the ratchet 158 by the pawl 160 will move the arm 164, which through its spring connection with the outstanding arm 170 will cause a forward feed of the conveyor. If by chance this forward impulse is slightly more than is required, the spring 171 will expand to take care of this difference. If this forward impulse is of an excessive character, the pin 168 will advance until it comes in contact with the outstanding arm 170 which will retain the arm 164 and cause the spring-pressed finger 163 to ratchet into the following indenture.

What I claim is:

1. In a slicing machine, the combination of a reciprocal knife, a movable support for said knife, a pair of relatively separated reciprocatory bars arranged adjacent the support, and means for moving the knife support to alternately shift said knife into active engagement with the reciprocatory bars.

2. In a slicing machine, the combination of a reciprocal knife, a shiftable frame for supporting the knife, a pair of alternately actuated knife operating means arranged adjacent the frame, and means for shifting the frame to alternately move the knife into active engagement with the knife operating means.

3. In a slicing machine, the combination of a feed trough, means for intermittently advancing the article through said trough, a gauge-plate at the exit end of the feed trough, a reciprocatory knife adapted to sever slices from the article projecting beyond the trough and resting against the gauge-plate, and a reciprocatory means associated with the gauge-plate and adapted to be projected through and beyond the face thereof after each cutting operation to prevent the slices from adhering to the face of the gauge-plate.

4. In a slicing machine, a reciprocal knife adapted to be actuated in a plurality of angularly disposed cutting positions, reciprocatory means for the knife arranged in each of the angularly disposed cutting positions, and means for alternately shifting the knife into active engagement with said reciprocatory means.

5. In a slicing machine, a reciprocal knife adapted to be set and successively operated in a plurality of angularly disposed cutting positions, actuating means for said knife arranged in each cutting position, and means for alternately shifting the knife into active engagement with said actuating means in each of said angularly disposed positions.

6. In a slicing machine, comprising a reciprocal knife, a pair of operating mechanisms arranged in angularly disposed positions for successively actuating the knife, and means for alternately moving the knife into active association with said operating mechanisms.

7. In a slicing machine, comprising a reciprocal knife adapted to be actuated in a plurality of angularly disposed cutting positions, a plurality of independently actuated operating mechanisms for successively reciprocating the knife, and means for alternately moving the knife into active association with said operating mechanisms.

8. In a slicing machine comprising a reciprocatory knife, a shiftable support for said knife adapted to successively move said knife into a plurality of set cutting positions, and a reciprocatory means arranged in each of the set positions of the knife for actuating said knife in any of its set positions.

9. In a slicing machine comprising a knife adapted for adjustment into several set cutting positions, a reciprocatory means for actuating the knife arranged in each of the cutting positions thereof, and means for alternately moving the knife into active engagement with said reciprocatory means.

10. In a slicing machine comprising a reciprocal knife, means for automatically setting the knife in a plurality of angularly disposed cutting positions, a reciprocatory mechanism arranged in each angularly disposed cutting position of the knife, and means for shifting the knife into active engagement with said reciprocatory mechanism.

11. In a slicing machine comprising a reciprocal knife, means for alternately changing the angular cutting position of said knife, a reciprocatory knife actuating mechanism arranged in each angularly cutting position of the knife, and means for moving the knife into active engagement with said reciprocatory mechanism and a plurality of reciprocal knife operating means for actuating the knife in any of said cutting positions.

12. In a slicing machine, the combination of a feed trough, a hopper at the inlet end of the feed trough for supplying articles thereto, an intermittently operated conveyor for transporting the articles through the trough, a gauge-plate for arresting the forward movement of the articles at the exit end of the trough, and a reciprocatory knife adapted to sever slices from the articles resting against the gauge-plate, and a slice-releasing mechanism associated with the gauge-plate comprising a plurality of relatively-spaced rods, means for reciprocating said rods after each cutting operation to project the rods through and beyond the face of the gauge-plate to prevent the slices from adhering thereto.

13. In a slicing machine, the combination of a knife, a movable support for said knife, a plurality of reciprocatory knife-actuating mechanisms arranged adjacent the support, and means for moving the knife support to alternately shift the knife into active engagement with the actuating mechanisms.

14. In a slicing machine, the combination of a knife, a movable support for said knife, a pair of relatively separated and reciprocatory operated knife-actuating mechanisms arranged adjacent the support, and means for moving the knife support to alternately shift said knife into active engagement with the actuating mechanisms.

15. In a slicing machine, the combination of a knife, a movable support for said knife, a pair of alternately operated reciprocatory knife-actuating mechanisms arranged adjacent the support, and means for moving the knife support to alternately shift said knife into active engagement with the actuating mechanisms.

GEORGE A. SCHMITT.